United States Patent
Zhang

(10) Patent No.: US 8,610,854 B2
(45) Date of Patent: Dec. 17, 2013

(54) LIQUID CRYSTAL DISPLAY PANEL AND PIXEL ELECTRODE THEREOF

(75) Inventor: Xin Zhang, Shenzhen (CN)

(73) Assignees: Shenzhen China Star Optoelectronics Technology Co., Ltd., Shenzhen, Guangdong Province (CN); Shanghai Tianma Microelectronics Co., Ltd., Shanghai (CN)

( * ) Notice: Subject to any disclaimer, the term of this patent is extended or adjusted under 35 U.S.C. 154(b) by 56 days.

(21) Appl. No.: 13/381,365

(22) PCT Filed: Aug. 30, 2011

(86) PCT No.: PCT/CN2011/079127
§ 371 (c)(1),
(2), (4) Date: Dec. 28, 2011

(87) PCT Pub. No.: WO2012/171273
PCT Pub. Date: Dec. 20, 2012

(65) Prior Publication Data
US 2012/0314154 A1   Dec. 13, 2012

(30) Foreign Application Priority Data
Jun. 13, 2011   (CN) .......................... 2011 1 0157455

(51) Int. Cl.
*G02F 1/1337*   (2006.01)

(52) U.S. Cl.
USPC ........................................... 349/129; 349/130

(58) Field of Classification Search
None
See application file for complete search history.

(56) References Cited

U.S. PATENT DOCUMENTS

2005/0179844 A1* 8/2005 Roosendaal et al. .......... 349/139
2009/0201454 A1* 8/2009 Kume et al. .................... 349/129

* cited by examiner

*Primary Examiner* — Bumsuk Won
*Assistant Examiner* — Ryan Crockett
(74) *Attorney, Agent, or Firm* — Cheng-Ju Chiang

(57) ABSTRACT

A pixel electrode of a liquid crystal display panel is electrically connected to an end of a switch unit of the liquid crystal display panel, and includes: a plurality of branches, which is connected to a frame, each of the branches extending from the frame at a given angle into an interior of the frame; adjacent ones of the branches being sequentially juxtaposed by being spaced by cutoffs; the plurality of branches having tailing ends that define an opening having a configuration of mirror symmetry in the interior of the frame; and an orientation layer being arranged below the frame to cover the frame. Through use of the pixel electrode of the present invention, the liquid crystal display panel shows increased transmittance and improved displaying performance.

8 Claims, 8 Drawing Sheets

LIQUID CRYSTAL DISPLAY PANEL AND PIXEL ELECTRODE THEREOF

CROSS REFERENCES TO RELATED APPLICATIONS

This application claims the priority of Chinese Patent Application No. 201110157455.0, of which the title is "A Liquid Crystal Display Panel and Pixel Electrode Thereof", filed with Chinese Patent Office on Jun. 13, 2011, which, in its entirety is hereby incorporated for reference.

BACKGROUND OF THE INVENTION

1. Field of the Invention

The present invention relates to the field of liquid crystal displaying techniques, and in particular to a liquid crystal display panel and a pixel electrode.

2. The Related Arts

Liquid crystal displays are gradually getting wide applications as a displaying device for various electronic devices, such as mobile phones, personal digital assistants (PDAs), digital cameras, computer monitor screens, or notebook computer screens. A liquid crystal display device comprises a backlight module and a liquid crystal display panel. The liquid crystal display panel is formed of two substrates and a layer of liquid crystal filled between the substrates. The manufacturing techniques of the liquid crystal display panel are very diverse and a vertical alignment (VA) liquid crystal display panel is the most common one.

In a VA liquid crystal display panel, an aligning gap is formed in a pixel electrode of a pixel in order to have liquid crystal molecules generating a specific aligning direction. FIG. 1 is a schematic view showing a structure of VA mode liquid crystal display panel according to conventional technology. As shown in FIG. 1, a unit pixel electrode structure 1 of liquid crystal display panel comprises a data line DL, a scan line SL, a thin film transistor 114, and a pixel electrode (not shown). The pixel electrode is located in a pixel area and shows a snow flake like layout. The pixel electrode is composed of three portions, including a vertical central main trunk 111, a horizontal central main trunk 112, and branches 113 that include an angle of ±45 degrees or ±135 degrees with respect to the X-axis. The vertical main trunk 111 and the horizontal main trunk 112 equally divide the pixel area into four domains and each domain is formed by laying flat the electrode branches 113 of 45 degree inclination. As such, a snow flake like configuration of electrode that is of mirror symmetry for both upper and lower portions and left and right portions is formed. Some of the branches 113 are electrically connected to the thin film transistor 114 to transmit a voltage from the data line DL, via the thin film transistor 114, to the pixel electrode.

Further, FIG. 2 is a schematic view illustrating orientation of liquid crystal molecules with a voltage applied to the pixel electrode of FIG. 1. Referring to FIG. 2, in which the unit pixel electrode is designated at 100 and is identical to the unit pixel electrode structure 1 shown in FIG. 1, when the snow flake like pixel electrode is energized, liquid crystal 120 shows orientation that is gradually inclined from outside of the pixel electrode toward the inside and the angle of inclination is along the extension direction of the branches. The inclination directions of liquid crystal of the four domains are respectively ±45 degrees and ±135 degrees and all point to a central zone of the pixel. Specifically, as shown in FIG. 2, the angles of the orientations of liquid crystal of the four domains with respect to the x axis (the scan line) are: −135 degrees for the first quadrant, −45 degrees for the second quadrant, 45 degrees for the third quadrant, and 135 degrees for the fourth quadrant.

The liquid crystal of FIG. 1 shows an inclination angle that is inclined from outside toward inside and having an orientation pointing inward of the pixel. In such a structure of pixel electrode, the vertical main trunk 111 and the horizontal main trunk 112 at the center of the pixel electrode are both light-blocked area and this makes the transmittance of the main trunk areas 111, 112 null. Consequently, such an arrangement reduces the aperture ratio of the liquid crystal display panel.

To address the issue of aperture ratio of FIG. 1, the structure of pixel electrode shown in FIG. 3 is available. FIG. 3 is a schematic view showing another structure of VA mode liquid crystal display panel according to the conventional technology. As shown in FIG. 3, a unit pixel electrode structure 400 of liquid crystal display panel comprises a data line DL, a scan line SL, a thin film transistor 414, and a pixel electrode (not shown). The pixel electrode is also located inside the pixel area and shows a pattern that is different from that of the previously discussed pixel electrode. In this arrangement, the pixel electrode comprises a square frame 411 and electrode branches 413 located inside the frame. The plurality of electrode branches 413 forms in a center thereof an opening 412, and the opening 412 substantially divides the area of the pixel into four equal domains. Each domain is formed by laying flat the electrode branches 413 that are of inclination of 45 degrees. Further, FIG. 4 is a schematic view illustrating orientation of liquid crystal molecules with a voltage applied to the pixel electrode of FIG. 3. Referring to FIG. 4, when the pixel electrode is energized, liquid crystal 420 shows orientation that is gradually inclined from inside of the pixel electrode toward the outside and the angle of inclination is along the extension direction of the electrode branches. The inclination directions of liquid crystal of the four domains are respectively ±45 degrees and ±135 degrees and the directions point from a central area of the pixel toward four corners of the pixel area. It can be found that with the pixel electrode receiving a voltage, the liquid crystal molecules incline from inside to outside so as not to squeeze the central area. Consequently, a circuit designer is allowed to minimize the area of the central opening 412 and thus, the surface area of non-opening zone is significantly reduced and an increased aperture ratio is obtained.

Further, FIG. 5 is a schematic view illustrating orientation of liquid crystal molecules with a voltage applied to the pixel electrode of FIG. 3. It can be found by viewing FIG. 5 that although adoption of the structure of pixel electrode shown in FIG. 3 dissolve the issue of aperture ratio, yet the pattern displayed in the pixel electrode area of FIG. 5 reveals that light-blocked areas exist in the four domains defined by the pixel electrode and this indicates that the orientations of the liquid crystals within the light-blocked areas show an included angle of 0 degree or 90 degrees with respect to the x axis. As a consequence, a phenomenon of disclination line is resulted in the whole pixel electrode and the transmittance of panel is reduced.

SUMMARY OF THE INVENTION

The present invention provides an electrode and a liquid crystal display panel comprising the pixel electrode for effectively overcoming the technical issue of reduced transmittance occurring in the conventional liquid crystal display panels.

To overcome the above technical issue, the present invention provides a pixel electrode of liquid crystal display panel, which comprises: a frame, which is electrically connected to an end of a switch unit of a liquid crystal display panel; a plurality of electrode branches, which is connected to the frame, each of the branches extending from the frame at a given angle into an interior of the frame; adjacent ones of the branches being sequentially juxtaposed by being spaced by cutoffs; the plurality of branches having tailing ends that define an opening having a configuration of mirror symmetry in the interior of the frame; and an orientation layer being arranged below the frame to cover the frame.

Preferably, the orientation layer is arranged on a glass substrate. An insulation passivation layer is formed on the orientation layer. The frame of the pixel electrode is arranged on the insulation passivation layer.

Preferably, the orientation layer has an edge forming a slope surface, and the slope surface shows an included angle less than 90 degrees with respect to a horizontal surface.

Preferably, the opening having a configuration of mirror symmetry defined in the interior of the frame by the tailing ends of the branches is a cruciform opening, a linear opening, or a snow flake like opening.

Preferably, the cutoffs between the plurality of branches are not all of identical size and the plurality of branches is not all of identical width.

Preferably, the plurality of branches extends at an angle of 45 degrees from the frame into the frame.

Correspondingly, the present invention provides a liquid crystal display panel, which comprises a data line, a scan line, a switch unit, and a pixel area. Arranged inside the pixel area is a pixel electrode, which is the pixel electrode according to the present invention discussed above.

Practicing the embodiment of the present invention provides the following advantages:

The embodiment of the present invention provides a liquid crystal display panel and a pixel electrode, which use an orientation section arranged below the frame of the pixel electrode to change the orientation of the liquid crystal molecules so as to convert the light-blocked area that shows an angle of 0 degree and 90 degrees with respect to the X axis into a light-transmitting area. Thus, the embodiment of the present invention eliminates the deficiency of disclination line generated in the liquid crystal display panel and improves transmittance of the liquid crystal display panel.

BRIEF DESCRIPTION OF THE DRAWINGS

To more clearly describe the technical solution of the embodiments according to the present invention or the prior art techniques, a brief description of the drawings that are necessary for the illustration of the embodiments or the prior art will be given as follows. Apparently, the drawings described below show only example embodiments of the present invention and for those having ordinary skills in the art, other drawings may be easily obtained from these drawings without paying any creative effort.

DETAILED DESCRIPTION OF THE PREFERRED EMBODIMENTS

In view of the drawback that the conventional pixel electrode structure of liquid crystal display device still have certain local areas that shows low transmission rate and poor displaying performance, the present invention provides a novel pixel electrode and a liquid crystal display panel comprising the pixel electrode in order to effectively overcome the drawback.

Figure 1:
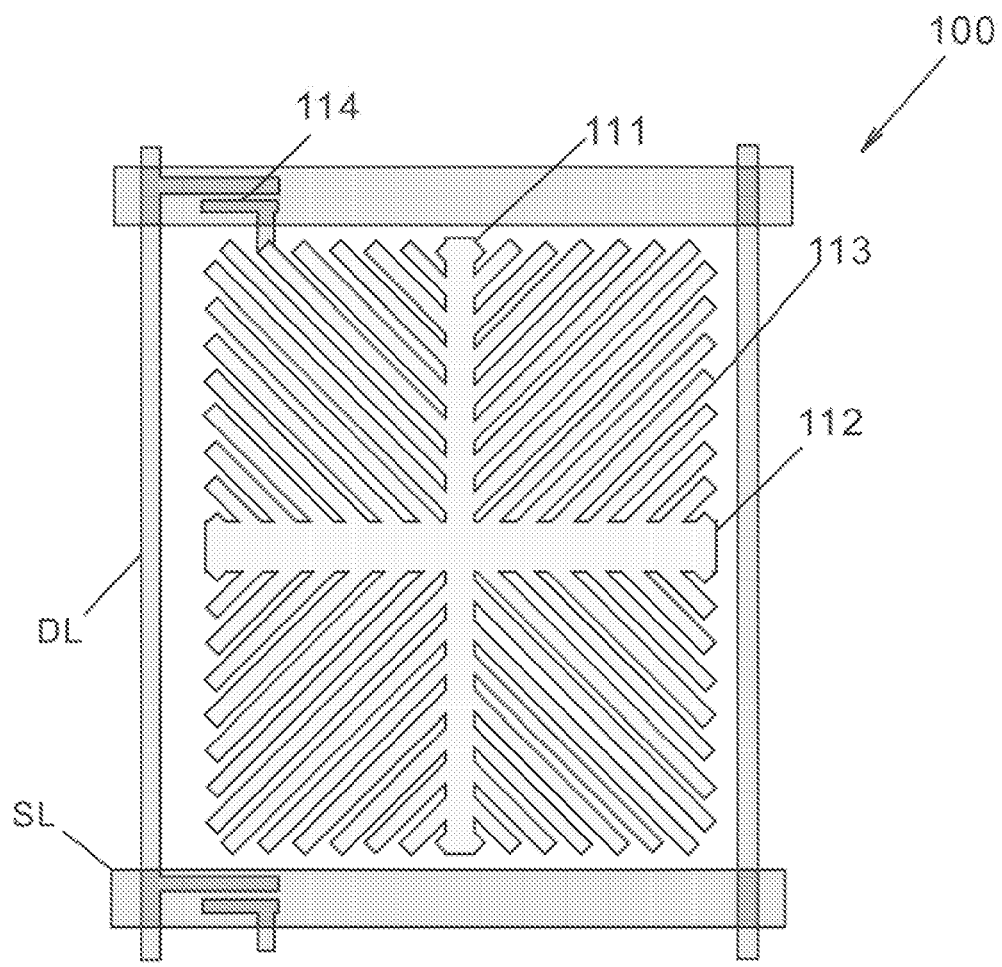
FIG. 1 is a schematic view showing a structure of VA (Vertical Alignment) mode liquid crystal display panel according to conventional technology.
Figure 2:
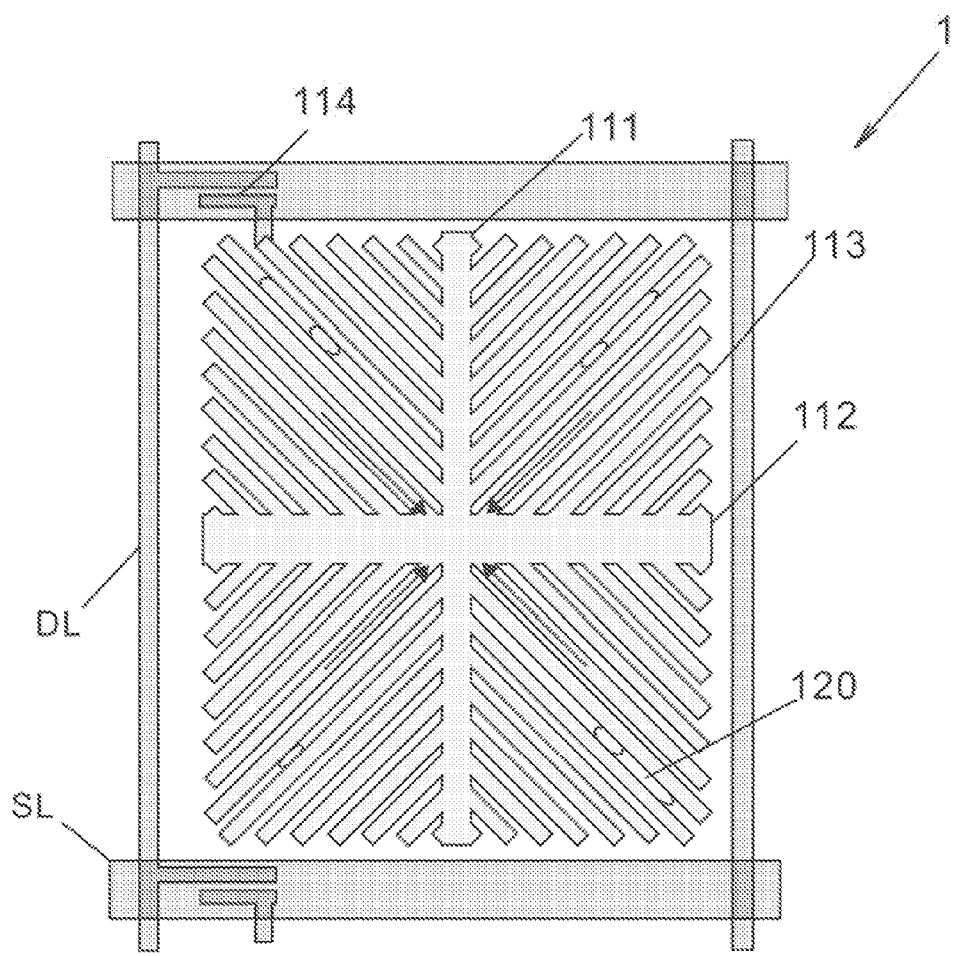
FIG. 2 is a schematic view illustrating orientation of liquid crystal molecules with a voltage applied to the pixel electrode of FIG. 1.
Figure 3:
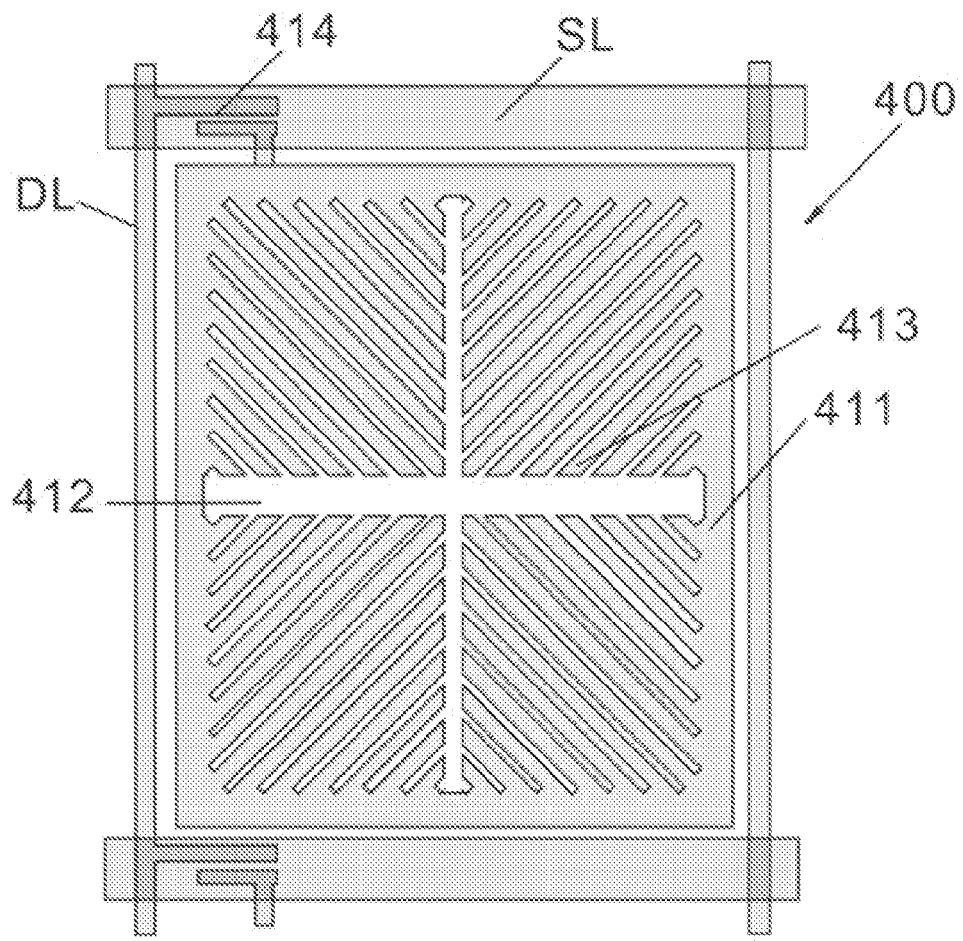
FIG. 3 is a schematic view showing another structure of VA mode liquid crystal display panel according to the conventional technology.
Figure 4:
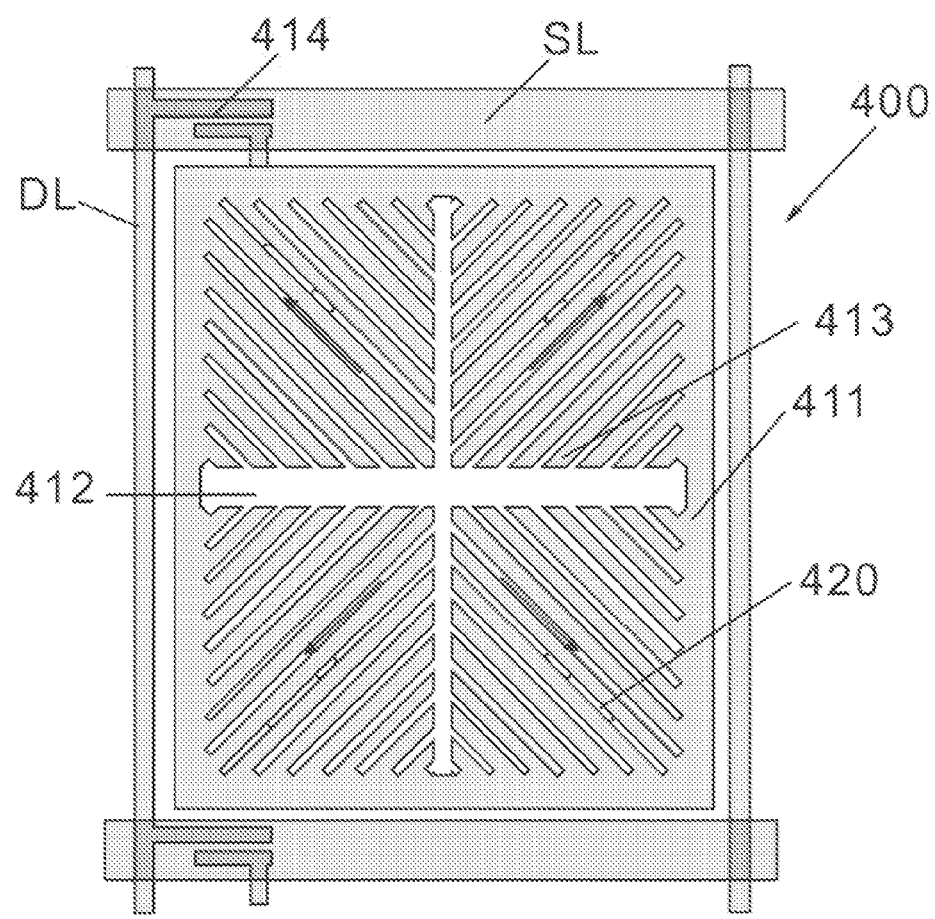
FIG. 4 is a schematic view illustrating orientation of liquid crystal molecules with a voltage applied to the pixel electrode of FIG. 3.
Figure 5:
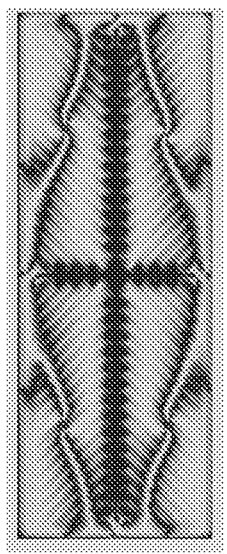
FIG. 5 illustrates a displayed pattern of a displaying area of the pixel electrode shown in FIG. 3.
Figure 6:
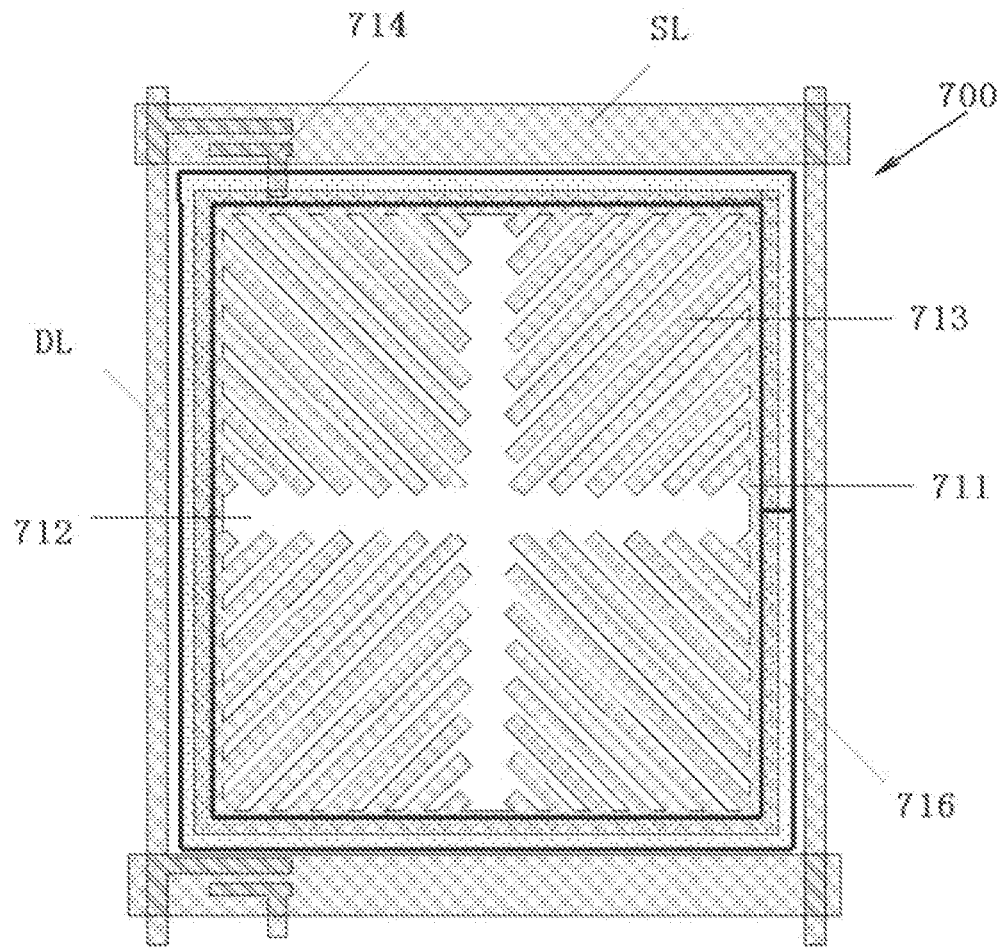
FIG. 6 is a schematic view illustrating a structure of liquid crystal display panel according to an embodiment provided by the present invention.

FIG. 6 is a schematic view illustrating a structure of liquid crystal display panel according to an embodiment provided by the present invention. As shown in FIG. 6, a schematic cross-sectional view of the liquid crystal display panel provided by the present invention is given. It is noted that the illustration made here is given by taking a vertical align (VA) liquid crystal display panel as an example of the liquid crystal display panel provided by the present invention, and in practical applications, the structure of pixel electrode according to the present invention is also applicable to other display panel having similar functionality or other equipment.

Specifically, as shown in FIG. 6, a unit pixel electrode structure 700 of liquid crystal display panel according to an embodiment of the present invention comprises a data line DL, a scan line SL, a switch unit 714, and a pixel electrode (not shown). Specifically, the switch unit 714 can be a thin film transistor or other units having the same switching function. Further, the pixel electrode of the instant embodiment comprises a frame 711, a plurality of branches 713 located inside the frame 711, and an orientation layer 716 located below the frame 711 to cover the frame. The plurality of branches 713 are of a strip like structure, and the strip like structures are connected to the frame and extend at angle of 45 degrees (the angle being not limited to 45 degrees in practical applications and being selectively any other angles) from the frame 711 in a direction into the interior of the frame 711. Adjacent ones of the branches 713 are sequentially arranged by being spaced with a cutoff therebetween. The plurality of branches 713 has tailing end sections that define an opening 712 having a configuration of mirror symmetry in the interior of the frame. The opening 712 generally divides the ear of the pixel into four domains and each domain is formed by laying flat the branches 713 of 45 degree inclination.

The frame 711 is electrically connected to an end of the switch unit 714. The switch unit 714 is electrically connected to the scan line SL. Thus, a voltage transmitted through the scan line SL can be transmitted to the pixel electrode through the switch unit 714 and the frame 71.

The branches 713 of the four domains show different directions and the directions thereof form included angles with respect to X axis (the scan line SL) respectively corresponding to ±45 degrees and ±135 degrees. In a preferred embodiment of the present invention, all the directions of the branches 713 are set pointing toward a center of the pixel area. In other words, as shown in FIG. 6, the branches 713 in the first quadrant show an included angle of −135 degrees with respect to the scan line SL, the branches 713 in the first quadrant show an included angle of −135 degrees with respect to the scan line SL, the branches 713 in the second quadrant show an included angle of −45 degrees with respect to the scan line SL, the branches 713 in the third quadrant show an included angle of 45 degrees with respect to the scan line SL, and the branches 713 in the fourth quadrant show an included angle of 135 degrees with respect to the scan line SL. In practical applications, the included angle between each branch and the scan line SL can be designed as any other angle by a circuit designer and such variations are considered within the scope of the present invention.

Figure 7:
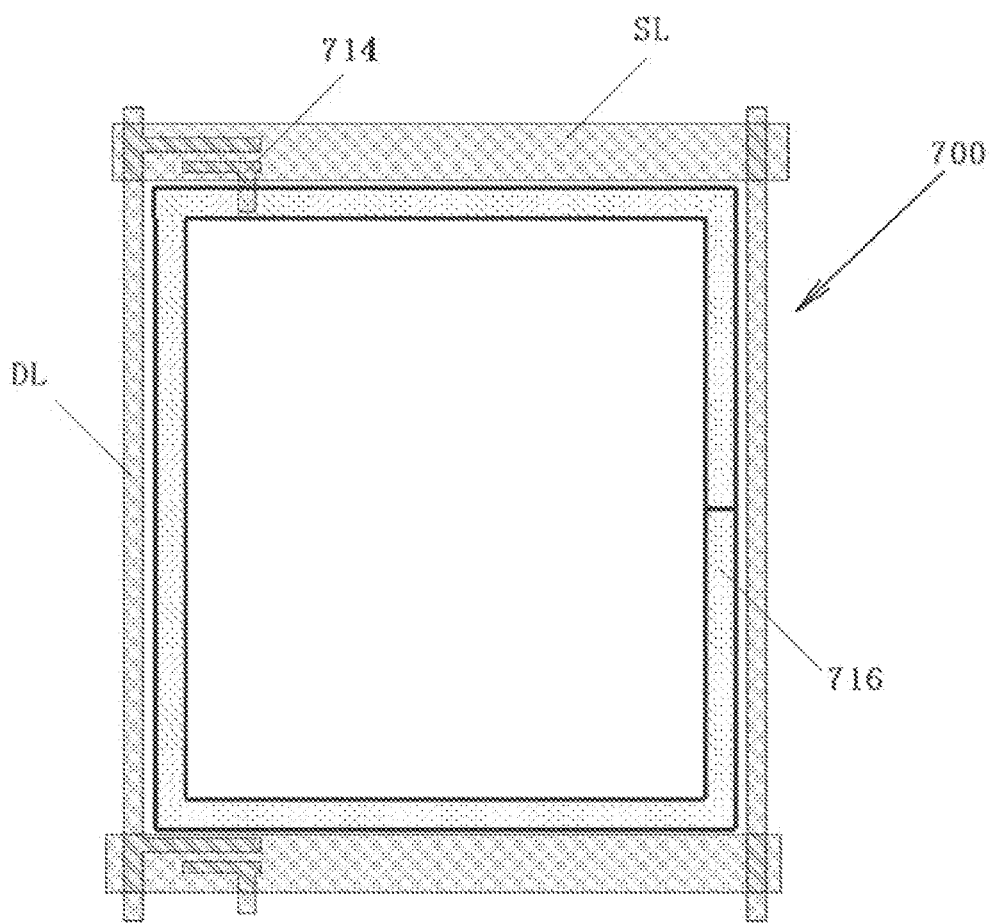
FIG. 7 is a schematic view showing the structure of the liquid crystal display panel of FIG. 6 with pixel electrode removed.

FIG. 7 is a schematic view showing the structure of the liquid crystal display panel of FIG. 6 with the pixel electrode removed. Referring to FIG. 7, a schematic view of the structure of FIG. 6 with the pixel electrode removed. As shown in FIG. 7, the orientation layer 716 according to the present invention is located within a rectangular frame delimited by data lines DL and scan lines SL and has a shape corresponding to the frame of the pixel electrode and has a thickness and edges that satisfy the requirement that when upper and lower substrates of the liquid crystal display panel induce a potential difference therebetween, the orientation layer 716 may generate electrical lines of force of which the direction of electrical lines of force faces inward for electrode on slope surfaces thereof having an angle less than 90 degrees with respect to a horizontal surface (the electrode being specifically a transparent conductive glass, ITO, edges of the orientation layer being slope surfaces that have an included angle of preferably 20-70 degrees with respect to the horizontal surface), and electrical lines of force cause an adjustment of orientation of the liquid crystal molecules within a light-blocked area of the pixel electrode to have the liquid crystal molecules in the light-blocked area showing an included angle not in a condition of 0 degree or 90 degrees with respect to the X axis of the scan line SL so that the light-blocked area is converted into a light-transmitting area. In practical applications, the orientation layer 716 can be metal or other materials.

Figure 8:
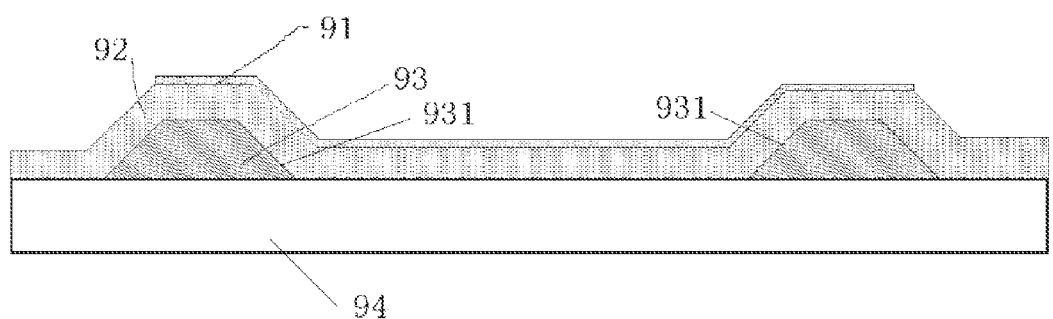
FIG. 8 is a cross-sectional view showing a portion of the structure of the liquid crystal display panel according to the present invention.
Figure 9:
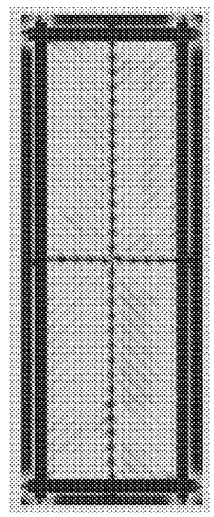
FIG. 9 illustrates a displayed pattern of a displaying area of the pixel electrode shown in FIG. 6.

FIG. 8 is a cross-sectional view showing a portion of the structure of the liquid crystal display panel according to the present invention. As shown in FIG. 8, the liquid crystal display panel according to the present invention comprises, sequentially from top to bottom, a pixel electrode layer 91 (transparent conductive glass ITO layer), an insulation passivation layer 92, an orientation layer 93, and a glass substrate 94. It is seen from FIG. 9 that when the liquid crystal display panel is energized and a potential difference is induced between upper and lower substrates thereof, the orientation layer 716 generates electrical lines of force of which the direction of electrical lines of force faces inward for electrode on slope surfaces 931 thereof having an angle less than 90 degrees with respect to a horizontal surface (the electrode being specifically a transparent conductive glass, ITO, edges of the orientation layer being slope surfaces that have an included angle of preferably 20-70 degrees with respect to the horizontal surface), and electrical lines of force cause an adjustment of orientation of the liquid crystal molecules within a light-blocked area of the pixel electrode to have the liquid crystal molecules in the light-blocked area showing an included angle not in a condition of 0 degree or 90 degrees with respect to the X axis of the scan line SL so that the light-blocked area is converted into a light-transmitting area, thereby dissolving the deficiency of disclination line found in the conventional liquid crystal display panels. FIG. 9 illustrates a displayed pattern of a displaying area of the pixel electrode shown in FIG. 6, and it is found from FIG. 9 that the displaying pattern generated according to the present invention does not cause any phenomenon of disclination line.

Further, it is noted here that in the embodiment of the present invention, the frame 711 and the orientation layer 716 are both of a rectangular configuration, but, in practical applications, they can be of other shapes, such as circle, regular hexagon, regular octagon, and the likes. The opening 712 is also not limited to the cruciform configuration illustrated in the embodiment and may alternatively be a linear configuration or a snow flake like configuration or other openings that divide the branches 713 into upper and lower portions or left and right portions that are of mirror symmetry, all being considered within the scope of the present invention. Further, the cutoffs between the plurality of branches 713 may not be all identical and widths of the plurality of branches 713 may not be all identical.

The liquid crystal display panel and the pixel electrode provided according to the embodiment of the present invention uses an orientation section arranged below the frame of a pixel electrode to change the orientation of the liquid crystal molecules so as to convert the light-blocked area that shows an angle of 0 degree and 90 degrees with respect to the X axis into a light-transmitting area. Thus, the embodiment of the present invention eliminates the deficiency of disclination line generated in the liquid crystal display panel and improves transmittance of the liquid crystal display panel.

In summary, although the present invention has been described with reference to the preferred embodiment thereof, the preferred embodiment is not to limit the scope of the present invention. Various variations and modifications can be contemplated by those having ordinary skills in the art without departing from the spirits and scope of the present invention and thus, the scope of protection provided by the present invention is determined by the appended claims.

The description given above is a preferred embodiment of the present invention and it is noted that for those having ordinary skills of the art, numerous improvements and modifications can be made without departing the principles of the present invention. Such improvements and modifications are considered within the scope of protection of the present invention.

What is claimed is:
1. A pixel electrode, comprising:
a frame, electrically connected to an end of a switch unit of a liquid crystal display panel;
a plurality of branches, connected to said frame, each branch extending from said frame inwardly at a fixed included angle;
adjacent branches sequentially arranged at intervals by cutoffs;
a plurality of openings formed on ends of the plurality of branches and arranged in mirror symmetry inside said frame; and
an orientation layer, covering said frame and arranged below said frame; wherein
said orientation layer is arranged on a glass substrate, an insulation passivation layer being formed on said orientation layer, said frame of said pixel electrode being arranged on said insulation passivation layer, the orientation layer being made of metal and insulated from the frame by the insulation passivation layer, the orientation layer inducing electrical lines of force that extend inward.

2. The pixel electrode as claimed in claim 1, wherein said orientation layer has an edge forming a slope surface, said slope surface showing an included angle less than 90 degrees with respect to a horizontal surface.

3. The pixel electrode as claimed in claim 1, wherein said opening having a configuration of mirror symmetry defined inside said frame by said ends of said branches is a cruciform opening, a linear opening, or a snow flake like opening.

4. The pixel electrode as claimed in claim 1, wherein said cutoffs between the plurality of branches are not all of an identical size and the plurality of branches is not all of an identical width.

5. The pixel electrode as claimed in claim 1, wherein the plurality of branches extends from said frame inwardly at an included angle of 45 degrees.

6. A liquid crystal display panel, comprising a data line, a scan line, a switch unit, and a pixel area, a pixel electrode being arranged in said pixel area, wherein said pixel electrode comprises:
   a frame, electrically connected to an end of the switch unit of the liquid crystal display panel;
   a plurality of branches, connected to said frame, each branch extending from said frame inwardly at a fixed included angle and adjacent branches being sequentially arranged at intervals by cutoffs;
   a plurality of openings formed on ends of the plurality of branches and arranged in mirror symmetry inside said frame; and
   an orientation layer, covering said frame and arranged below said frame; wherein
   said orientation layer is arranged on a glass substrate, an insulation passivation layer being formed on said orientation layer, said frame of said pixel electrode being arranged on said insulation passivation layer, the orientation layer being made of metal and insulated from the frame by the insulation passivation layer, the orientation layer inducing electrical lines of force that extends inward.

7. The liquid crystal display panel as claimed in claim 6, wherein said orientation layer has an edge forming a slope surface, said slope surface showing an included angle less than 90 degrees with respect to a horizontal surface.

8. The liquid crystal display panel as claimed in claim 6, wherein the plurality of branches extends from the frame inwardly at an angle of 45 degrees.

* * * * *